United States Patent
Lee et al.

(10) Patent No.: US 9,453,565 B2
(45) Date of Patent: Sep. 27, 2016

(54) TORQUE CONVERTER IN VEHICLE

(71) Applicant: Korea Powertrain Co., Ltd., Daegu (KR)

(72) Inventors: Jin-Soo Lee, Daegu (KR); Jin-Moon Kim, Daegu (KR)

(73) Assignee: Korea Powertrain Co., Ltd., Daegu (KR)

( * ) Notice: Subject to any disclaimer, the term of this patent is extended or adjusted under 35 U.S.C. 154(b) by 0 days.

(21) Appl. No.: 14/410,830

(22) PCT Filed: Apr. 9, 2013

(86) PCT No.: PCT/KR2013/002940
§ 371 (c)(1),
(2) Date: Dec. 23, 2014

(87) PCT Pub. No.: WO2014/092252
PCT Pub. Date: Jun. 19, 2014

(65) Prior Publication Data
US 2015/0354684 A1    Dec. 10, 2015

(30) Foreign Application Priority Data
Dec. 14, 2012  (KR) .................. 10-2012-0146719

(51) Int. Cl.
| | |
|---|---|
| *F16H 45/02* | (2006.01) |
| *F16F 15/134* | (2006.01) |
| *F16F 15/14* | (2006.01) |
| *F16F 15/131* | (2006.01) |
| *F16F 15/12* | (2006.01) |
| *F16H 41/24* | (2006.01) |

(52) U.S. Cl.
CPC .............. *F16H 45/02* (2013.01); *F16F 15/12* (2013.01); *F16F 15/13128* (2013.01); *F16F 15/13469* (2013.01); *F16H 41/24* (2013.01); *F16H 2045/0205* (2013.01); *F16H 2045/0226* (2013.01); *F16H 2045/0263* (2013.01); *F16H 2045/0278* (2013.01); *F16H 2045/0294* (2013.01)

(58) Field of Classification Search
CPC ........... F16H 45/02; F16H 2045/0205; F16H 2045/0226; F16H 2045/0263; F16H 2045/0294; F16F 15/10–15/18
See application file for complete search history.

(56) References Cited

U.S. PATENT DOCUMENTS

| | | | | |
|---|---|---|---|---|
| 2011/0099992 | A1* | 5/2011 | Magerkurth | .......... F16F 15/145 60/435 |
| 2011/0240429 | A1* | 10/2011 | Heuler | .......... F16F 15/145 192/3.28 |
| 2011/0287844 | A1* | 11/2011 | Steinberger | ....... F16F 15/13492 464/68.8 |

FOREIGN PATENT DOCUMENTS

| | | | | |
|---|---|---|---|---|
| DE | 102012204186 | * | 10/2012 | ............ F16F 15/145 |
| JP | 11030292 | A | 2/1999 | |

(Continued)

*Primary Examiner* — Richard Lorence
(74) *Attorney, Agent, or Firm* — Dinsmore & Shohl LLP

(57) ABSTRACT

Disclosed is a torque converter in a vehicle, which permits putting a lock-up clutch into operation while sufficiently attenuating vibration at all rotation speed ranges of a low rotation speed range to a high rotation speed range of an engine.
The torque converter in a vehicle includes a lock-up clutch and a torsional damper, wherein the torsional damper has one side with a first centrifugal absorbing unit provided thereto for absorbing vibration and impact by centrifugal force, and a spline hub has one side with a second centrifugal absorbing unit for absorbing vibration and impact by centrifugal force.

6 Claims, 5 Drawing Sheets

(56) References Cited

FOREIGN PATENT DOCUMENTS

| | | |
|---|---|---|
| JP | 11-063208 A | 3/1999 |
| JP | 2000274489 A | 10/2000 |
| JP | 2002266944 A | 9/2002 |
| JP | 2006090528 A | 4/2006 |
| KR | 1019990008802 | 5/1999 |
| KR | 1020040015409 A | 2/2004 |
| KR | 100487061 | 5/2005 |
| KR | 101200482 B1 | 11/2012 |

* cited by examiner

TORQUE CONVERTER IN VEHICLE

CROSS-REFERENCE TO RELATED APPLICATIONS

This application is the U.S. National Phase of PCT/KR2013/002940 filed Apr. 9, 2013, which claims priority of Korean Patent Application 10-2012-0146719 filed Dec. 14, 2012.

BACKGROUND OF THE INVENTION (a) Field of the Invention

The present invention relates to a torque converter in a vehicle, which allows a lock-up clutch to be put into operation while sufficiently attenuating vibration at all rotation speed ranges of a low rotation speed range to a high rotation speed range of an engine.

(b) Description of the Related Art

In general, a torque converter is mounted between an engine and a transmission of a vehicle for transmission of driving power from the engine to the transmission by using a fluid. The torque converter is provided with an impeller for receiving the driving power from the engine to rotate, a turbine for being rotated by oil being discharged from the impeller, and a reactor (also called a stator) for directing an oil flow returning to the impeller in a rotation direction of the impeller to enhance a torque change rate.

Since power transmission efficiency of the torque converter may be reduced if a load on the engine becomes high, the torque converter has a lock-up clutch (also called a damper clutch) which can directly connect the engine and the transmission. The lock-up clutch is arranged between a front cover directly connected to the engine and the turbine for direct transmission of the torque from the engine to the transmission through the turbine.

The lock-up clutch includes a piston at a turbine shaft, which is movable in an axial direction. The torque converter is provided with a torsional damper for absorbing vibration and impact acting in a rotation direction when the lock-up clutch is in operation.

Such a related art torque converter has a problem in that, since vibration is intensive when the lock-up clutch is operated at the low rotation speed range of the engine, the lock-up clutch is operated at a high rotation speed range over a certain rotation speed, which causes poor mileage of the vehicle.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a torque converter in a vehicle having an advantage of improvement of mileage Accordingly, an object of the present invention suggested to solve the above problem is to provide a torque converter in a vehicle, which can sufficiently attenuate vibration and impact in a rotation direction, not only in a high rotation speed range but also in a low rotation speed range of the engine, to operate a lock-up clutch in the low rotation speed range of the engine for achieving improvement of fuel mileage.

To achieve the object of the present invention, a torque converter in a vehicle includes a front cover, an impeller connected to the front cover to rotate together with the front cover, a turbine arranged at a position opposite to the impeller, a reactor positioned between the impeller and the turbine for changing an oil flow from the turbine toward the impeller, a lock-up clutch having a piston for directly connecting the front cover to the turbine, a torsional damper coupled to the lock-up clutch for absorbing an impact and vibration acting in a rotation direction, and a spline hub connected to the torsional damper for forwarding driving power from the torsional damper to a transmission, wherein the torsional damper has one side with a first centrifugal absorbing unit coupled thereto for absorbing vibration and impact by centrifugal force, and the spline hub has one side with a second centrifugal absorbing unit coupled thereto for absorbing vibration and impact by centrifugal force.

The first centrifugal absorbing unit or the second centrifugal absorbing unit may include a holding plate, a plurality of pendulums arranged on one or both sides of the holding plate, and a plurality of coupling pins for coupling the pendulum to the holding plate such that a position of the pendulum varies with the centrifugal force.

The holding plate and the pendulum may have a plurality of coupling holes for inserting the coupling pin therein, wherein each of the coupling holes is a curved long hole.

The curved long holes provided to the holding plate and the pendulum may be arranged to have shapes opposite to each other.

It is preferable that the pendulum may have one side with a plurality of dams provided thereto.

It is preferable that each dam is a projection from the pendulum to a predetermined height parallel to a shaft extended to have a predetermined length in a radial direction with reference to the shaft.

The lock-up clutch may include a friction plate arranged between the front cover and the lock-up clutch, and friction members coupled to both sides of the friction plate.

The torsional damper may include a drive plate for having the driving power forwarded thereto from the lock-up clutch, outer springs elastically held by the drive plate for absorbing the vibration and impact in a rotation direction, a first cover plate and a second cover plate for retaining the outer springs, a plurality of inner springs arranged in the rotation direction retained by the first cover plate and the second cover plate, and a driven plate connected to the spline hub elastically supported by the inner springs for having the driving power forwarded thereto The torque converter in a vehicle in accordance with exemplary embodiments of the present invention includes the torsional damper having the first centrifugal absorbing unit with the pendulums provided thereto and the spline hub having the second centrifugal absorbing unit with the pendulums provided thereto, enabling the pendulums to act continuously, not only in a low rotation speed range of the engine but also in a high rotation speed range of the engine to reduce vibration and impact in the rotation direction distinctively, permitting effect of operating the lock-up clutch even in the low rotation speed range of the engine, thereby improving mileage of the vehicle.

DETAILED DESCRIPTION OF THE EMBODIMENTS

Figure 1:
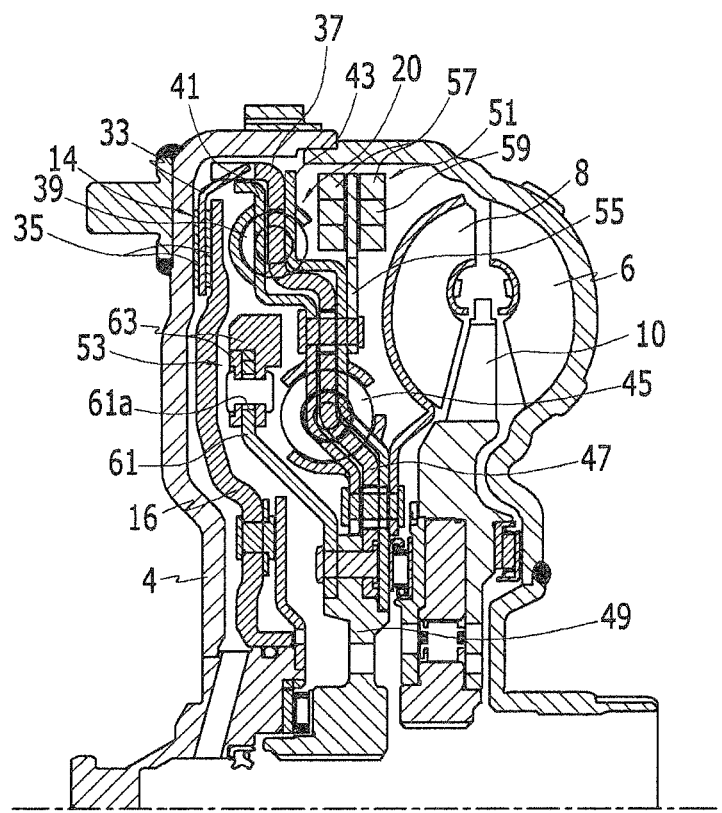
FIG. 1 illustrates an axial half cross-sectional view of a torque converter for describing an exemplary embodiment of the present invention.

Hereafter, a torque converter in a vehicle in accordance with exemplary embodiments of the present invention will be described with reference to the accompanying drawings such that persons in this field of art may easily carry out the present invention. As those skilled in the art would realize, the described embodiments may be modified in various different ways, all without departing from the spirit or scope of the present invention. Parts in the drawings not relevant to description of the present invention are omitted for describing the present invention clearly, and like reference numerals designate like elements throughout the specification.

FIG. 1 illustrates an axial half cross-sectional view of a torque converter in a vehicle for describing an exemplary embodiment of the present invention, showing a torque converter in a vehicle.

The torque converter in accordance with an exemplary embodiment of the present invention includes a front cover 4 rotatably connected to a crankshaft of an engine, an impeller 6 connected to the front cover 4 to rotate together with the front cover 4, a turbine 8 arranged at a position opposite to the impeller 6, and a reactor (also called a stator) 10 positioned between the impeller 6 and the turbine 8 for changing an oil flow from the turbine 8 to forward the oil flow toward the impeller 6. The reactor 10 which forwards the oil toward the impeller 6 has the same rotation center as the front cover 4. Further, the torque converter in accordance with an exemplary embodiment of the present invention includes a lock-up clutch 14 used as means for directly connecting the engine to the transmission. The lock-up clutch 14 is arranged between the front cover 4 and the turbine 8.

The lock-up clutch 14, substantially in a disc shape, has a piston 16 provided thereto to be movable in an axial direction.

The lock-up clutch 14 has a torsional damper 20 coupled thereto.

The torsional damper 20 serves to forward driving power forwarded thereto through the lock-up clutch 14 to the turbine 8 to absorb torsional force acting in a rotation direction of the shaft and to attenuate vibration.

The lock-up clutch 14 includes a friction plate 33 arranged between the front cover 4 and the piston 16. The friction plate 33 has friction members 35 coupled to both sides thereof. Accordingly, if the piston 16 moves toward the front cover 4 by hydraulic pressure, the lock-up clutch 14 may have the friction members 35 brought into close contact with the front cover 4 and the piston 16, to forward the driving power from the front cover 4 to the friction plate 33.

Figure 2:
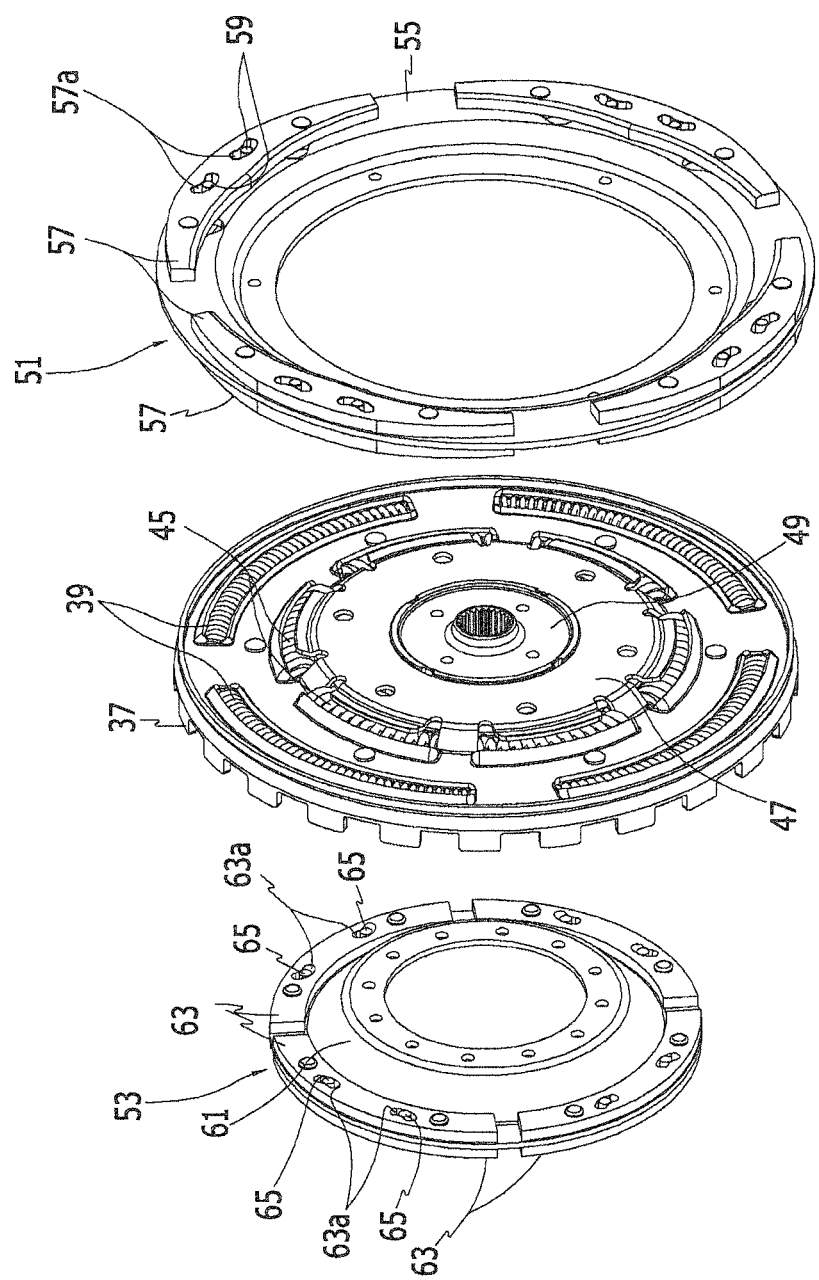
FIG. 2 illustrates an exploded perspective view of key parts in FIG. 1.
Figure 3:
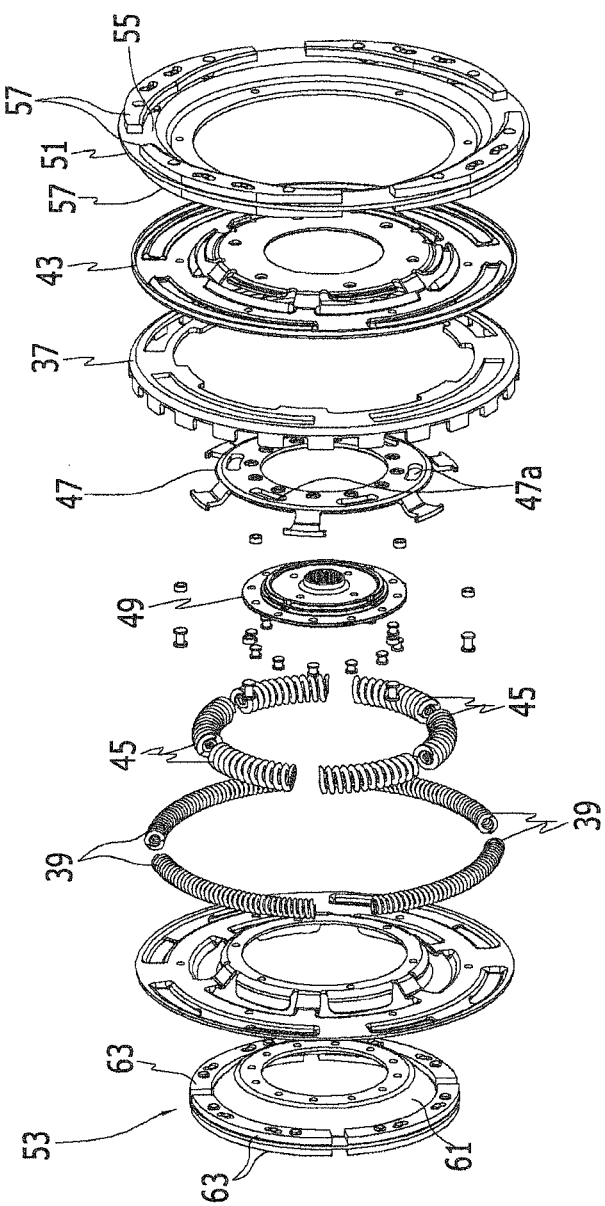
FIG. 3 illustrates an exploded perspective view of the torsional damper in FIG. 2.

Referring to FIGS. 1 to 3, the torsional damper 20 includes a drive plate 37, an outer spring 39, a first cover plate 41, a second cover plate 43, an inner spring 45, and a driven plate 47.

The drive plate 37 may be engaged with the friction plate 33 of the lock-up clutch 14 for having the driving power forwarded thereto from the friction plate 33.

Multiple outer springs 39 are arranged in a circumferential direction of the drive plate 37 are elastically held by the drive plate 37. It is preferable that each outer spring 39 is a compression coil spring.

The first cover plate 41 and the second cover plate 43 are arranged to surround the outer spring 39 to elastically retain the outer spring 39. The first cover plate 41 and the second cover plate 43 may be arranged opposite to each other. That is, the driving power may be forwarded from the drive plate 37 to the first cover plate 41 and the second cover plate 43 through the outer spring 39. In this course, the outer spring 39 may absorb the vibration and impact in the rotation direction.

The inner spring 45 is arranged in the circumferential direction of the driven plate 47 retained by the first cover plate 41 and the second cover plate 43. Further, it is preferable that the inner spring 45 is arranged on an inner side of the outer spring 39 with reference to the rotation shaft.

The inner spring 45 is elastically held by the driven plate 47. That is, the driving power forwarded to the first cover plate 41 and the second cover plate 43 is forwarded to the driven plate 47 through the inner spring 45. In this course, the inner spring 45 may absorb the vibration and impact in the rotation direction, again.

The driven plate 47 is connected to a spline hub 49. The spline hub 49 may forward the driving power from the engine to the transmission.

The driven plate 47 has a plurality of long holes 47a provided along a circumferential direction thereof. The first cover plate 41 and the second cover plate 43 are connected to the long holes 47a with rivets to mechanically function as a stopper.

In the meantime, the second cover plate 43 may have a first centrifugal absorbing unit 51 coupled thereto with rivets, and the spline hub 49 may have a second centrifugal absorbing unit 53 coupled thereto with rivets. The first centrifugal absorbing unit 51 and the second centrifugal absorbing unit 53 may have pendulums arranged thereon to be movable in a radial direction by centrifugal force to serve as mass bodies for absorbing the vibration and impact in the rotation direction.

Figure 4:
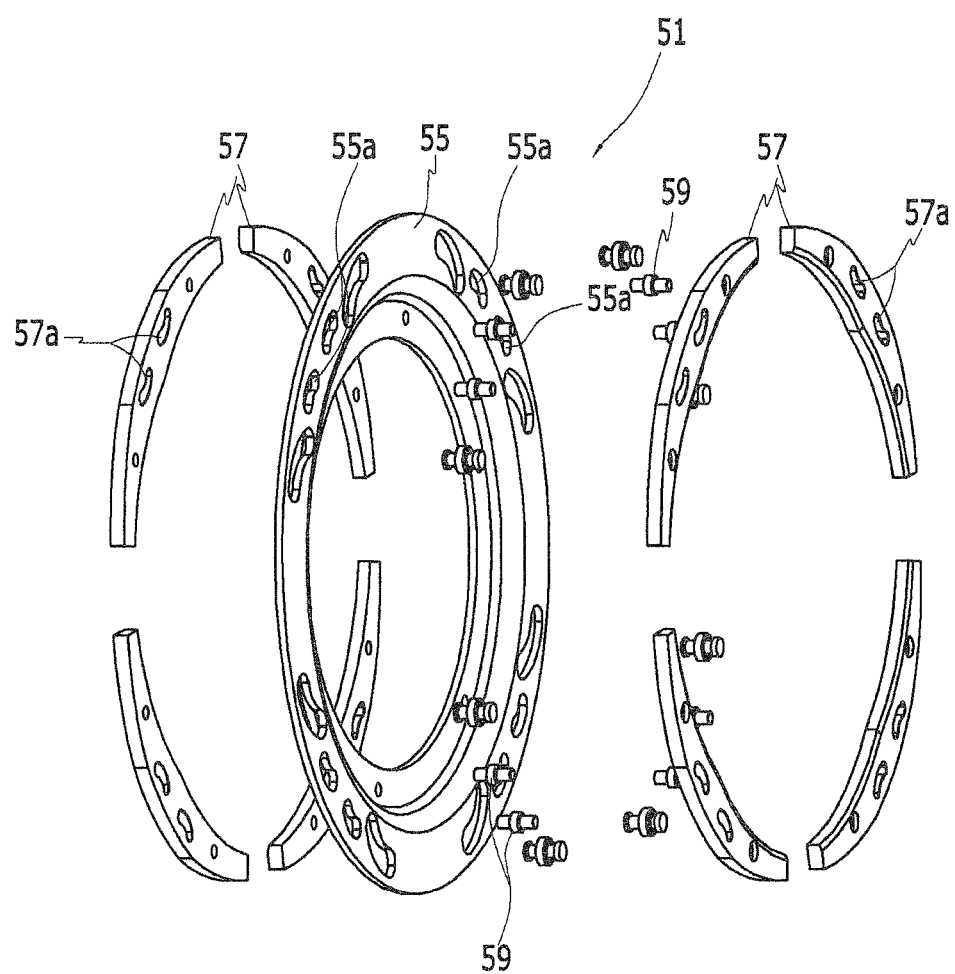
FIG. 4 illustrates an exploded perspective view of the first centrifugal absorbing unit in FIG. 2.

The first centrifugal absorbing unit 51 in accordance with an exemplary embodiment of the present invention will be described in detail with reference to FIG. 4.

The first centrifugal absorbing unit 51 may include a first holding plate 55, a plurality of pendulums 57, and a plurality of coupling pins 59.

The first holding plate 55 may be coupled to the second cover plate 43 with rivets. The first holding plate 55 has a plurality of coupling holes 55a provided thereto. It is preferable that the coupling holes 55a are curved long holes.

The pendulum 57 has a plurality of coupling holes 57a provided thereto. The coupling holes 57a provided to the pendulum 57 may also be curved long holes having a shape opposite to the coupling holes 55a provided to the first holding plate 55.

The coupling holes 55a and 57a have the coupling pin 59 inserted therein to couple the first holding plate 55 and the pendulums 57. The coupling holes 55a and 57a make the pendulum 57 coupled with the coupling pin 59 move in a fixed locus by the centrifugal force.

The second centrifugal absorbing unit 53 includes a second holding plate 61, a plurality of pendulums 63, and a plurality of coupling pins 65 (see FIGS. 1 to 3).

The second holding plate 61 may be coupled to one side of the spline hub 49 with rivets.

The second holding plate 61 may have a plurality of other coupling holes 61a provided thereto. It is preferable that the coupling holes 61a provided to the second holding plate 61 are also curved long holes.

The pendulum 63 coupled to the second holding plate 61 has a plurality of coupling holes 63a (see FIG. 2) provided thereto. The coupling holes 63a provided to the pendulum 63 coupled to the second holding plate 61 are also curved long holes having a shape opposite to the coupling holes 61a provided to the second holding plate 61.

The coupling holes 61a and 63a have the coupling pin 65 inserted therein to couple the second holding plate 61 to the pendulum 63. The coupling holes 61a and 63a make the pendulum 63 coupled with the coupling pin 65 moves along a fixed locus by centrifugal force.

That is, the first centrifugal absorbing unit 51 and the second centrifugal absorbing unit 53 may have identical or similar structures.

The operation of the torque converter in a vehicle in accordance with an exemplary embodiment of the present invention will now be described with reference to FIGS. 1 to 4.

If the lock-up clutch 14 is not in operation, the driving power is forwarded from the engine to the transmission through the front cover 4, the impeller 6, the turbine 8, the first cover plate 41, the second cover plate 43, the inner spring 45, the driven plate 47, and the spline hub 49. In this course, the inner spring 45 may absorb the vibration and impact in the rotation direction.

If the lock-up clutch 14 is in operation, the piston 16 moves to the front cover 4 by hydraulic pressure. Then, the friction members 35 provided to both sides of the friction plate 33 are brought into close contact with the inside of the front cover 4 and one side of the piston 16 to forward the driving power from the front cover 4 to friction plate 33. The driving power is forwarded from the friction plate 33 to the drive plate 37. The drive plate 37 forwards the driving power to the first cover plate 41 and the second cover plate 43 while compressing the outer spring 39. In this course, the outer spring 39 absorbs the vibration and impact in the rotation direction with reference to the rotation center.

Then, the first cover plate 41 and the second cover plate 43 compress the inner spring 45. Subsequently, the driving power is forwarded to the driven plate 47 as the inner spring 45 is compressed. In this course, the inner spring 45 absorbs the vibration and impact in the rotation direction with reference to the rotation center.

Then, the driving power is forwarded from the driven plate 47 to the transmission through the spline hub 49.

In these courses, the pendulums 57 and 63 provided to the first centrifugal absorbing unit 51 and the second centrifugal absorbing unit 53 absorb the vibration and the impact while moved along an outside circumferential direction or a locus designed with reference to the rotation center, by centrifugal force.

That is, when the engine is driven, the pendulums 57 and 63 provided to the first centrifugal absorbing unit 51 and the second centrifugal absorbing unit 53 absorb the vibration and the impact regardless of the rotation speed of the engine being in a low speed state or a high speed state while moved by the centrifugal force.

If the torque converter in a vehicle in accordance with an exemplary embodiment of the present invention is mounted to the vehicle, enabling the vibration to be adequately absorbed even if the rotation speed is low, which allows operation of the lock-up clutch 14 that connects the engine to the transmission directly even at a low rotation speed of the engine, the mileage of the vehicle can be improved. If the torque converter in a vehicle in accordance with an exemplary embodiment of the present invention is mounted to a rear wheel drive type of torque converter having a comparatively large inside clearance, much more effective mileage improvement may be achieved.

Figure 5:
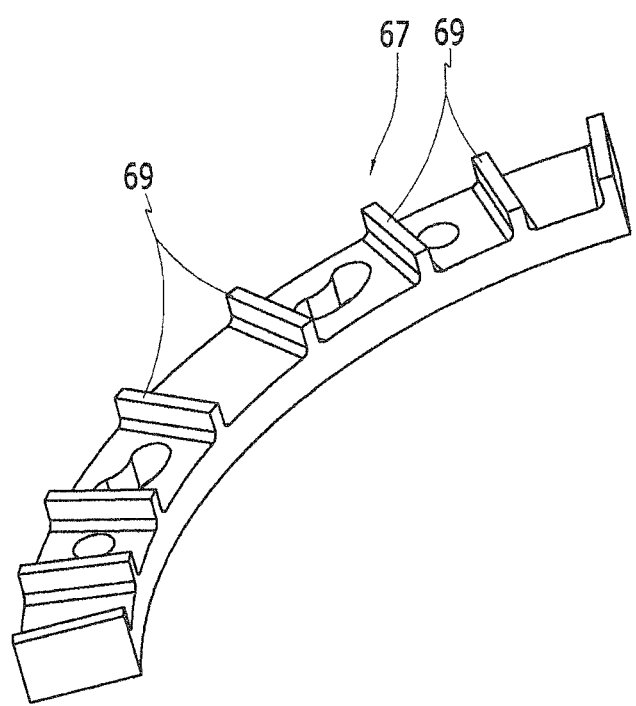
FIG. 5 illustrates a perspective view of another exemplary embodiment of the present invention.

FIG. 5 illustrates a perspective view of another exemplary embodiment of the present invention, showing a pendulum 67. Since the pendulum 67 in accordance with the current exemplary embodiment of the present invention is different from the pendulums 57 and 63 of the foregoing exemplary embodiment of the present invention in view of structures thereof, the pendulum 67 is given another reference numeral, and the pendulum 67 will be described focused on different points from the pendulums 57 and 63 while description of identical portions are omitted.

The pendulum 67 in accordance with the current exemplary embodiment of the present invention has one side thereof provided with a plurality of dams 69 spaced apart from one another. The dams 69 may be formed of the same material as the pendulum 67. Each of the dams 69 may be a projection from the pendulum 67 to a predetermined height parallel to a shaft extended to have a predetermined length in a radial direction with reference to the shaft. The dams 69 may make a fluid damping effect take place, in which the dams 69 may cause resistance of a fluid filled in the torque converter when the dams 69 are rotated round the shaft. Since the dams 69 enable a mass increase effect owing to the fluid resistance when the pendulum 67 rotates, a vibration attenuation effect can be maximized without increasing weight of the pendulum 67.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A torque converter in a vehicle comprising:
   a front cover;
   an impeller connected to the front cover to rotate together with the front cover;
   a turbine arranged at a position opposite to the impeller;
   a reactor positioned between the impeller and the turbine for changing an oil flow from the turbine toward the impeller;
   a lock-up clutch having a piston for connecting the front cover to the turbine;
   a torsional damper coupled to the lock-up clutch for absorbing an impact and vibration acting in a rotation direction; and
   a spline hub connected to the torsional damper for forwarding driving power from the torsional damper to a transmission,
   wherein the torsional damper has one side with a first centrifugal absorbing unit coupled thereto for absorbing vibration and impact by centrifugal force, the spline hub has one side with a second centrifugal absorbing unit coupled thereto for absorbing vibration and impact by centrifugal force, wherein the first centrifugal absorbing unit or the second centrifugal absorbing unit includes a holding plate, a plurality of pendulums arranged on one or both sides of the holding plate, and a plurality of coupling pins for coupling the pendulums to the holding plate such that a position of the pendulums varies with the centrifugal force, and wherein at least one of said pendulums has one side with a plurality of dams provided thereto.

2. The torque converter of claim 1, wherein the holding plate and the pendulums have a plurality of coupling holes for inserting the coupling pins therein, wherein each of the coupling holes is a curved long hole.

3. The torque converter of claim 2, wherein the curved long holes provided to the holding plate and at least one of said pendulums are arranged to have shapes opposite to each other.

4. The torque converter of claim 1, wherein each dam is a projection from at least one of said pendulums to a predetermined height and has a predetermined length in a radial direction.

5. The torque converter of claim 1, wherein the lock-up clutch includes a friction plate arranged between the front cover and the piston, and friction members coupled to both sides of the friction plate.

6. The torque converter of claim 1, wherein the torsional damper includes a drive plate for having the driving power forwarded thereto from the lock-up clutch, outer springs elastically held by the drive plate for absorbing the vibration and impact in a rotation direction, a first cover plate and a second cover plate for retaining the outer springs, a plurality of inner springs arranged in the rotation direction retained by the first cover plate and the second cover plate, and a driven plate connected to the spline hub elastically supported by the inner springs for having the driving power forwarded thereto.

* * * * *